United States Patent Office 3,179,424
Patented Apr. 20, 1965

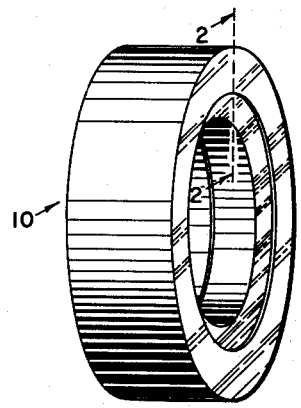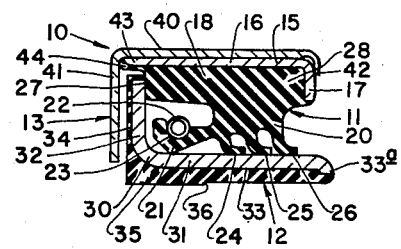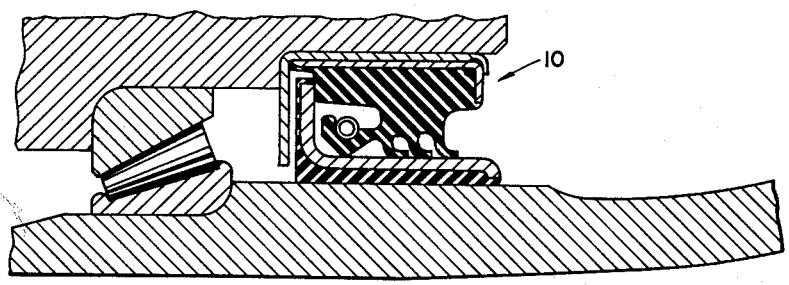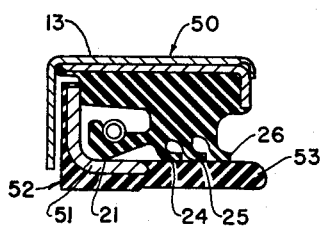
FIG. 1
FIG. 2
FIG. 3
FIG. 4

3,179,424
UNITIZED SEAL
Brian H. Carson, Woodside, and John G. Barr, Redwood City, Calif., assignors to Federal-Mogul-Bower Bearings, Inc., Detroit, Mich., a corporation of Michigan
Filed Apr. 23, 1962, Ser. No. 189,552
7 Claims. (Cl. 277—37)

This invention relates to an improved unitized seal.

Unitized seals, exemplified by Patent 3,011,814 to Rhoads and Corsi, comprise a seal of the lip type having its lip riding on a wear sleeve that is assembled permanently to the seal and unitized with it. Such seals have many advantages because they prevent shaft wear, can easily be replaced, and are sold, delivered, installed, and operated as a unit so that both the lip and the wear surface are protected.

An object of the present invention is to provide a very efficient unitized seal of a novel structure that aids in excluding dirt.

Dirt exclusion has been attempted heretofore in unitized seals by molding dirt-excluding lips as an integral part of a rubber lining on the wear sleeve. However, the elastomer which is most suitable for a wear sleeve lining is often ill suited for a lip-type seal and vice versa. The lining should be made of material such as neoprene that is resilient and even tends to bond somewhat to the shaft. The dirt-excluding lips should be made of material that is very tough and has excellent compression set characteristics, qualities that are not possessed by materials suited to the wear sleeve lining. In fact, the dirt-excluding lips need the same characteristics as the seal lip that rides on the wear sleeve. One object of the invention is to separate the dirt excluding lips from the wear sleeve lining so that optimum materials can be used in both portions.

Moreover, elastomers that retain their elasticity under compression tend to behave rather poorly under stretch and vice versa. Those with good abrasion resistance often have excellent properties under stretch but do not behave well under compression. An object of the present invention is to provide a unitized seal with a main sealing lip and a series of dirt-excluding lips, all the lips being under stretch so that elastomers having the best resistance to wear can be used.

One problem often met with oil seals is that of space limitations. Oil seals are often placed adjacent to a bearing so that the bore into which the seal is pressed should be not very different from that of the bearing. The bore for the seal is commonly fractionally larger so that the bearing does not have to be pressed into the whole depth of bore required to accommodate both seal and bearing, but for the most economical design the bore for the seal is normally only a few thousandths of an inch over the bearing size in order to keep castings and housing as small as practicable. It is frequently much easier to provide extra depth of bore rather than extra diameter, and for this reason it is important to keep the cross-sectional space between shaft and bore required for the seal as small as possible. An especial advantage of the seal of this invention is that it provides additional dirt protection while taking up very little more such cross-sectional area than a conventional seal, although some additional depth of bore is needed in order to allow for the space required for the additional lips in the seal.

The seals of this invention are specifically intended for applications where a heavy concentration of dirt or mud is to be kept out of the bearings. This might typically be in the support rollers for tracked vehicles like tanks or crawler tractors or in the wheels of heavy dirt-moving vehicles such as scrapers, rock movers, and road graders and the like type of off-highway construction vehicle. Sometimes the dirt is relatively dry, and sometimes it is very wet; sometimes the vehicle must even operate in submerged water conditions. An advantage of one form of the seal of this invention is that the surface on which the lips ride and seal is divided into a metal surface for the oil-retaining spring-loaded lip and a rubber surface for the dirt-excluding lips. This is especially advantageous because rubber is, in general, more abrasive-resistant than metal and also is quite impervious to rusting or similar deterioration by water. By controlling the length of the metal wear sleeve that surrounds the shaft and acts as the built-in shaft for the seal, it is possible for part of the seal-contacting surface to be metal and a part rubber, or for the whole to be metal. This can be done without any major change in the metal tooling or the molds and allows the seal to be produced in either form and to suit the specific circumstances of its end use without any great cost. It has been found that rubber running against rubber provides a very durable surface combination provided that the speeds are kept low so that there is only little heat to dissipate, and these conditions are must usually met with in heavy off-the-highway vehicles where speeds are not high and where the wheels are rather large tending to still further reduce the rotational speed of the shafts and the seals operating thereon.

Other objects and advantages of the invention will appear from the following description of a preferred embodiment thereof.

In the drawings:

FIG. 1 is a view in perspective of a complete seal embodying the principles of the present invention.

FIG. 2 is a fragmentary view in section taken along the lines 2—2 in FIG. 1.

FIG. 3 is a view in elevation and in section showing an installation incorporating the seal of FIGS. 1 and 2.

FIG. 4 is a view similar to FIG. 2 of a modified form of the invention.

The unitized seal 10 shown in FIGS. 1 to 3 includes a unitary molded oil seal 11, a unitary molded wear sleeve 12, and a unitizing case member 13. The three parts are joined together in a way that not only unitizes the seal as a whole, but provides a very efficient unit.

The seal 11 comprises a metal case 15 with a cylindrical portion 16 and a radial flange 17 at one end, and an elastomeric body 18 bonded to the metal case 15 and provided with a sealing portion 20. In this instance, the sealing portion 20 comprises a main lip 21 backed up by a spring 22 seated in a groove 23, and three auxiliary dust-sealing lips 24, 25, 26 all molded as a unit according to the principles of Patent 2,982,997.

At the end opposite the radial flange 17 of the metal case 15, the elastomer provides a bumper portion 27 which extends axially beyond any portion of the main sealing lip. It will be noted also that the dust sealing lips 24, 25, 26 and the main sealing lip 21 all lie completely within the axial dimensions of the metal case member 15 which protects the lips from members thrusting at them axially edgewise.

The wear sleeve 12 in the device of FIGS. 1–3 comprises a metal member 30 formed to provide a cylindrical portion 31 engaged by all of the sealing lips 21, 24, 25 and 26, a radially outwardly extending flange 32 at one end, and a short pinched-off radial portion 33a at the other end. The inner periphery 33 of the cylindrical portion 31 and the axially outer side 34 of the radial flange 32 are bonded to a rubber liner 35 which is provided with a stepped portion 36 enabling easier installation. The radially outwardly projecting flange 32 extends radially beyond the inner radial dimension of the bumper 27 so that in one direction it engages the bumper portion 27 when pushed axially; then further motion in that direction is prevented by the bumper portion 27.

The seal is unitized after assembly of the wear sleeve 12 with the seal 11 by combining with them the case member 13. This member 13 has a cylindrical portion 40, a radially inwardly extending confining portion or flange 41, and a radial turned-over portion 42 which holds the seal assembly 11 tightly to the case member 13. The flange 41 extends in far enough to prevent the radial flange 32 from coming out of the case 13 and therefore unitizes the wear sleeve 12 with the seal 11. It will be noted that the case 15 of the seal 12 has a portion 43 that extends beyond the bumper portion 27 and that there is an additional locking elastomeric gasket 44 extending beyond that. This defines the amount of play permitted in the seal so that the wear sleeve 12 can move a certain amount axially without being bound in, and therefore provides flexibility in axial movement and displacement of the wear sleeve 12 relative to the seal case 13, but due to the bumper portion 27 in one direction and the flange 41 in the other direction, the seal cannot come apart.

The seal 50 shown in FIG. 4 is identical except that the metal member 51 of the wear sleeve 52 is very short cylindrically and only the main oil retaining lip 21 rides on it. The lips 24, 25 and 26 ride on rubber provided by an extending portion 53 of the liner. It has been found that rubber running against rubber provides a very durable surface combination provided that the speeds are kept low so that there is only little heat to dissipate, and these conditions are most usually met with in heavy off-the-highway vehicles where speeds are not high and where the wheels are rather large tending to still further reduce the rotational speed of the shafts and the seals operating thereon.

To those skilled in the art to which this invention relates, many additional changes in construction and widely differing embodiments of the invention will suggest themselves without departing from the spirit and scope of the invention as defined in the claims.

What is claimed is:
1. A unitized seal including in combination:
   an oil seal having a metal inner case and an elastomeric member with a body portion spaced from one end of said case and a plurality of sealing lips lying axially within said body portion,
   an outer case member secured around said inner case and having a radially inwardly extending flange facing and spaced axially from said elastomeric body portion,
   a wear sleeve having a cylindrical portion on which the sealing lips ride and a radially outwardly extending flange extending into the space between said elastomeric body portion and said flange of said case member, and
   whereby said seal is unitized with the lips at all times in contact with the cylindrical portion of said wear sleeve.
2. The seal of claim 1 wherein said cylindrical portion of said wear sleeve provides a metal contact surface for all said lips.
3. The seal of claim 1 wherein said cylindrical portion of said wear sleeve provides metal contact for at least one said lip serving as oil-retaining lips and elastomeric contact for at least one other of said lips serving as a dirt-excluding lip.
4. A unitized seal including in combination:
   an oil seal having a metal inner case having a free end and an elastomeric member bonded thereto with a body portion and lip means, said body portion having a bumper portion at one end spaced axially in from the free end of said inner case,
   an outer case member secured around said inner case and having a radial flange extending in from said free end and opposite and spaced from said bumper portion, and
   a wear sleeve having a cylindrical portion on which the sealing lips ride and a radially outwardly extending flange extending into the space between the bumper portion and said outer case flange and radially outwardly far enough to contact said bumper portion and said flange when moved to its limit in each direction,
   whereby said seal is unitized with said lip means at all times in contact with the cylindrical portion of said wear sleeve.
5. The seal of claim 4 wherein said lip means comprises a plurality of lips and said cylindrical portion of said wear sleeve provides metal contact surface for all said lips.
6. The seal of claim 4 wherein said lip means provides one lip for oil retention and additional lips for dirt exclusion and said cylindrical portion of said wear sleeve provides metal contact for said oil retention lip and elastomer contact for said dirt-excluding lips.
7. The seal of claim 4 wherein said wear sleeve has an elastomer lining for shaft contact of different composition from that of said oil seal.

References Cited by the Examiner
UNITED STATES PATENTS

| 2,752,176 | 6/56 | Ayling | 277—41 |
| 2,982,997 | 5/61 | Plickii et al. | 277—208 X |
| 3,021,161 | 2/62 | Rhoads et al. | 277—37 |
| 3,072,413 | 1/63 | Parks | 277—39 X |

EDWARD V. BENHAM, *Primary Examiner.*

SAMUEL ROTHBERG, *Examiner.*